United States Patent [19]

Yokelson et al.

[11] Patent Number: 5,124,428
[45] Date of Patent: Jun. 23, 1992

[54] AMIDE-IMIDE RESIN FOR PRODUCTION OF HEAT-RESISTANT FIBER

[75] Inventors: Howard B. Yokelson, Aurora; Stefanos L. Sakellarides, West Chicago; Raymond T. Behrends, Lombard; Marifaith Hackett, Chicago, all of Ill.

[73] Assignee: Amoco Corporation, Chicago, Ill.

[21] Appl. No.: 708,493

[22] Filed: May 31, 1991

[51] Int. Cl.⁵ .................................. C08G 18/30
[52] U.S. Cl. ................................ 528/73; 528/350; 264/178 R; 264/178 F
[58] Field of Search ............ 528/73, 350; 264/178 R, 264/178 F

[56] References Cited

U.S. PATENT DOCUMENTS 4,467,083 8/1984 Grossman et al. .................. 528/73

Primary Examiner—Maurice J. Welsh
Attorney, Agent, or Firm—Matthew R. Hooper; William H. Magidson; Frank J. Sroka

[57] ABSTRACT

Fiber grade resin, fiber obtained therefrom, and fiber-containing articles wherein the resin comprises an amide-imide polymer having repeating units of the following general formula:

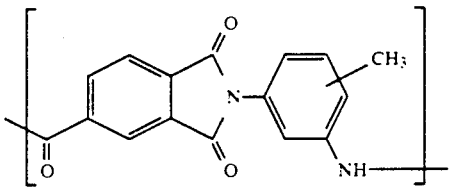

said resin having an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3

47 Claims, No Drawings

AMIDE-IMIDE RESIN FOR PRODUCTION OF HEAT-RESISTANT FIBER

BACKGROUND OF THE INVENTION

1. Field of the Invention

The present invention relates generally to polyamide-imide resins, and fibers obtained therefrom, and, more particularly, to resins comprising amide-imide polymer obtained from reactants which comprise the reactant pair trimellitic anhydride chloride (TMAC) and toluene diamine (TDA); or the reactant pair trimellitic anhydride (TMA) and toluene diisocyanate (TDI). The TMAC-TDA and TMA-TDI polyamide-imide resins of the present invention are defined in terms of specified inherent viscosity and molecular weight values which we have discovered are critical for obtaining resin which can be solution-spun into heat-resistant fiber of high quality. Accordingly, the present invention is directed to fiber grade resin comprising amide-imide repeating units of the following general formula:

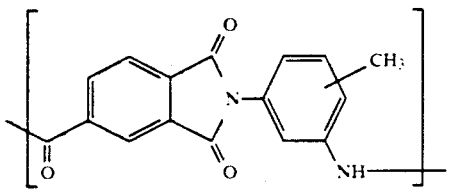

wherein the resin has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3. The invention is further directed to fiber solution-spun from such resin and having tenacity of at least 1.5, and preferably at least about 2.0 grams per denier, and elongation of at least about 10%, and preferably at least about 15%. In related aspects, the invention is further directed to methods for manufacturing polyamide-imide resin based on TMA-TDI or TMAC-TDA, as well as a method for solution-spinning fiber from the above-defined amide-imide resin. The fiber of the present invention has excellent thermal stability and can be incorporated in a wide variety of textile, paper or other fiber-containing products, both woven and non-woven, to impart heat and flame resistance.

2. Discussion of Background Art

There exists a strong need for heat-resistant fibers useful in the manufacture of protective clothing, high temperature filtration fabrics, electrical insulation paper, honeycomb construction used in aircraft, and a wide variety of other products in which resistance to heat is essential. Aromatic polyamide-imides are potentially well suited as resins for spinning heat-resistant fibers due to their high glass transition temperatures (typically above 250° C.), thermal oxidative stability, and inherent flame resistance. Although it may be possible in rare instances to achieve melt spinnability of aromatic polyamide-imide resins, resins having the greatest potential for flame resistant products generally are found to decompose before melting and must therefore be solution-spun. As is generally well known, solution-spinning is carried out by dissolving the fiber-forming resin in an appropriate solvent to obtain a spinning solution. The solution of "dope" is then forced through a spinneret into a coagulation bath in the case of wet solution-spinning, or into a gaseous medium in the case of dry solution-spinning. The organic liquid chosen for the coagulation bath, or the gaseous medium in the case of dry spinning, must be such that the dope solvent will dissolve or evaporate into it, but the polymer will not. As the dope solvent transfers out of the dope, fiber is formed.

Preparation of aromatic polyamide-imides from either trimellitic anhydride and aromatic diisocyanates, or from trimellitic anhydride chloride and aromatic diamines is well known in the literature, as are techniques for wet or dry solution-spinning of such resins into fiber. For example, R. Pigeon and P. Allard, in a published lecture entitled "Heat-Resistant and Flame-Resistant Fibers" (Die Angewandte Makromolekulare Chemie, Vol. 40/41, No. 600, pp 139-158, 1974) investigated the direct polycondensation reaction in polar solvent of trimellitic acid anhydride with different aromatic diisocyanates, as well as the solution-spinnability of the resulting polyamide-imide resins. In discussing the influence of differing diisocyanates on the polycondensation reaction with trimellitic acid anhydride, the authors state that the results of the polycondensation, as well as the spinning suitability of the obtained polymer, depend upon the reactivity of the diisocyanate as well as the solubility of the corresponding polymer. Although in Table 2 of this paper the authors disclose polyamide-imides prepared from trimellitic acid anhydride and the 2,6 or 2,4 isomers of toluene diisocyanate, they teach that only diisocyanates with two benzene nuclei (preferably diphenylmethane diisocyanate and diphenyloxide diisocyanate) have satisfactory reactivity, and produce resin of satisfactory solubility for solution-spinning. The data which the authors present in Table 2 of the paper reinforce this teaching insofar as no fiber properties (i.e. tenacity or elongation data) are given for the polyamide-imide prepared from toluene diisocyanate, whereas fiber data are shown for the polyamide-imides based on diphenylmethane diisocyanate and diphenyloxide diisocyanate. Considered as a whole, the Pigeon and Allard paper fails to teach a polyamide-imide fiber based upon trimellitic acid anhydride and toluene diisocyanate, particularly in view of the author's statement that only diisocyanates with two benzene nuclei are satisfactory.

Co-author P. Allard of the above-mentioned technical publication is also the inventor of U.S. Pat. Nos. 3,929,691 and 3,903,058 and a co-inventor of Rochina et al. U.S. Pat. No. 3,717,696, all of which deal with polyamide-imide resins based on the polycondensation products of trimellitic acid anhydride and aromatic diisocyanates, and the solution-spinning of heat-resistant fibers therefrom. Consistent with the teachings found in the technical publication of Pigeon and Allard, discussed above, these patents disclose a clear preference for polyamide-imides based on the reaction of trimellitic acid anhydride with an aromatic diisocyanate having two benzene nuclei. Notwithstanding the fact that the '696 and '058 patents disclose the suitability of mono- as well as bi-nuclear aromatic diisocyanates, the examples of all three of the above-mentioned patents are limited in their teaching of possible diisocyanates to 4,4' diisocyanatodiphenylmethane (sometimes referred to as methyl diphenyl isocyanate or "MDI") and 4,4' diisocyanatodiphenylether (sometimes referred to as oxydiphenyl isocyanate or "ODI").

The above-mentioned Allard '691 patent discloses wet or dry spinnable solutions of high molecular weight polyamide-imide copolymers in an anhydrous solvent which is inert to the copolymers, where the copolymers are derived from aromatic diisocyanates which contain two benzene nuclei (preferably ODI and MDI), an aromatic anhydride acid (preferably trimellitic acid anhydride), an aromatic or heterocyclic diacid (preferably isophthalic or terephthalic acids) and, optionally, a dianhydride (preferably pyromellitic dianhydride); and where the copolymers have an inherent viscosity between 0.5 and 1.6 dl/g, as measured by using a 0.5% strength solution thereof in N-methylpyrrolidone. The patent discloses conducting the copolymerization in the solvent such that the reaction temperature is progressively raised during the reaction from 25° to 100° C. at the beginning of the reaction to 120° to 250° C. at the end of the reaction. This patent does not disclose a fiber spinning solution in which the amide-imide polymer of the solution is derived from trimellitic acid anhydride and aromatic diisocyanates containing only one benzene nucleus, such as toluene diisocyanate.

The above-mentioned Rochina et al. '696 patent discloses a process for producing polyamide-imide filaments by dry spinning a solution of polyamide-imide under specified conditions. In a preferred embodiment, the polyamide-imide polymers in solution are extruded into filaments and fibers through a spinneret maintained at a temperature between 60° C. and 180° C.; then the filaments are heated at a temperature higher than about 160° C. up to about 240° C. at a constant length for 2 to 6 hours; and subsequently drawn at a drawing ratio of at least 3:1 at a temperature generally in the range of about 220° C. up to about 420° C. The patent states that thermal treatment of the fiber prior to drawing causes a substantial increase in the tensile strength of the drawn filaments. The patent further states at column 2, lines 38-41, that the polyamide-imides used in the invention must have an inherent viscosity greater than 0.4, and preferably from 0.8 to 1.4, as measured at 25° C. on a 0.5% weight for volume solution in the solvent used in the preparation of the polyamide-imide polymer. The patent discloses for use as the spinning solution polyamide-imide solutions obtained by reacting in substantially stoichiometric proportions in a polar organic solvent at least one aromatic diisocyanate and an acid reactant containing at least an aromatic anhydride-acid (preferably trimellitic acid anhydride) and optionally also at least one diacid such as terephthalic or isophthalic acid. Toluene diisocyanate is disclosed in the patent as among the suitable diisocyanates for preparing the polyamide-imide solution. The patent also points out that the polyamide-imide can alternatively be prepared by reaction of a diamine with the chloride derivative of the acid anhydride reactant. Despite the patent's mention of toluene diisocyanate, all of the patent's examples are limited to MDI and ODI, which are diamines having two benzene nuclei. The absence in the '696 patent of any example using toluene diisocyanate, or any other diamine or diisocyanate having only one benzene nucleus, is consistent with the teaching found in the co-inventor Allard's technical paper (discussed above) that only diisocyanates having two benzene nuclei are satisfactory for the production of fiber grade polyamide-imides.

The Allard et al. '058 patent, like the patents discussed above, is directed to heat stable fibers based on polyamide-imide resins which are the reaction product of reactants comprising aromatic diisocyanates and aromatic acid anhydrides. Again, while toluene diisocyanate is said to be a suitable reactant, there are no examples in the patent disclosing a fiber based on this reactant. The Allard '058 patent states that bright, homogeneous yarns can be obtained by wet spinning a solution containing a copolymer having both amide-imide and amide-acid groups.

Serres et al. U.S. Pat. No. 3,839,529 discloses preparation of polyamide-imide filaments based on the reaction product of an acyl halide derivative of trimellitic acid anhydride which contains at least one acyl halide group in the 4-ring position, with aromatic primary diamines in polar organic solvents at temperatures below 150° C. The resulting products are polyamic acids which are then water precipitated, heated, dry spun and cured (preferably with drawing) to obtain continuous filaments. More particularly, the process of the invention involves (1) heating the precipitated polyamic acid at a temperature between about 300° F. and 600° F.; (2) dissolving the heated polymer into a polar organic solvent at such a concentration that the solution viscosity of the resulting solution is at least 1500 poise, preferably between 2000-2500 poise, when measured at 25° C.; (3) spinning the polymer solution into a gaseous atmosphere which is maintained at a temperature of at least 450° F.; and (4) curing the spun filaments at a temperature above 300° F. for a time sufficient to convert substantially all of the carboxyl and amide groups available for further reaction to imide groups. According to the teachings of the patent, the tenacity of the fibers is enhanced by orienting (i.e., drawing) the fiber during the above mentioned curing step. The patent discloses, as useful diamines for preparation of the polyamic acids, wholly or largely aromatic primary diamines, particularly aromatic primary diamines containing from 6 to about 10 carbon atoms or aromatic primary diamines composed of two divalent aromatic moieties of from 6 to about 10 carbon atoms, each moiety containing one primary amine group, with the moieties linked directly or through bridging groups such as $-O-$, $-CH_2-$, $-CO-$, $-SO_2-$, and $-S-$. Polyamic acids or polyamide-imides based on toluene diisocyanate or toluene diamine are not specifically disclosed. The patent further states that the primary diamine reactant and the anhydride reactant are present in essentially equimolar amounts, and that variations of up to about 3 mole percent in either direction do not substantially affect the resulting polymer. Notwithstanding the many advantages disclosed in this patent, it is desired to avoid the separate disclosed step of precipitating the polyamic acid intermediate, as well as the step of heating the precipitated material or curing the fiber spun therefrom, which steps are utilized in the patent to convert the polyamic acid to polyamide-imide.

The ability to manufacture high quality heat-resistant fibers from polyamide-imide resin based on toluene diamine or toluene diisocyanate is highly desirable due to the lower cost of these reactants as compared with 4,4' diisocyanato- (or diamino-) diphenylmethane and 4,4' diisocyanato- (or diamino-) diphenylether. Moreover, the lower cost of toluene diisocyanate versus toluene diamine makes especially desirable the capability of producing high quality fiber from TMA-TDI resin. Nevertheless, despite considerable economic incentive, and notwithstanding the technical publication and patents referred to above, the art has not been able, to the best of our knowledge, to produce a high quality heat-resistant fiber from polyamide-imides based on the reaction of either trimellitic acid anhydride and toluene diisocyanate or trimellitic acid anhydride chloride and toluene diamine.

It is therefore an object of the present invention to provide a polyamide-imide resin based on the reactant pair of trimellitic acid anhydride and toluene diisocyanate, or the reactant pair of trimellitic acid anhydride chloride and toluene diamine; to provide heat-resistant fiber obtained therefrom; and to provide novel articles of manufacture comprised of such fiber having excellent thermal, mechanical and aesthetic properties. A further object of the invention is to provide a method for the preparation of the the above-mentioned polyamide-imide resins, and a method for solution-spinning the resins into fiber. Other objects will become apparant hereinafter to those skilled in the art.

SUMMARY OF THE INVENTION

We have now found that the above objects can be obtained in a resin comprising amide-imide repeating units of the following general formula:

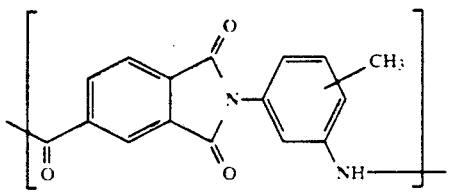

wherein said resin has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3. The resin having the aforementioned inherent viscosity and molecular weight characteristics preferably comprises the polymeric condensation product of reactants selected from the group of reactant pairs consisting of (a) trimellitic anhydride and toluene diisocyanate and (b) trimellitic anhydride chloride and toluene diamine, wherein at least about 90% of polymer linkages derived from anhydride groups are imide linkages.

The above-described resin is excellent for solution-spinning textile fiber because it has sufficiently high inherent viscosity and molecular weight to be above the brittle-ductile transition; it can be dissolved in a suitable organic polar solvent to provide a resin dope for solution-spinning; and, it provides as-spun fiber which can be drawn to obtain an oriented fiber having the fineness, strength, elongation and flexibility suitable for textile fiber processing. Accordingly, the present invention is further directed to solution-spun fiber obtained from the above described polyamide-imide resin, having tenacity of at least about 1.5 grams per denier and elongation of at least about 10%.

Particularly surprising and unexpected is the present invention's ability to consistently obtain a resin from the amide-imide condensation product of trimellitic anhydride and toluene diisocyanate, wherein the resin is excellent for solution spinning heat resistant fibers having commercially desirable tenacities and elongations. The complexities associated with the isocyanate chemistry, and the numerous side reactions that may be expected to occur, render the successful preparation of a fiber grade TMA-TDI resin highly unexpected and non-obvious.

The objects of the invention are further provided for in a process for manufacturing polyamide-imide resin from trimellitic anhydride chloride and toluene diamine which comprises the steps of:
(a) reacting, in a polar organic solvent in the presence of a suitable acid scavenger, trimellitic anhydride chloride and toluene diamine in a mole ratio of about 0.95:1 to about 1.01:1 to obtain a solution comprising a dissolved polymeric condensation product containing amide, imide and amic-acid linkages, wherein the reaction is carried out essentially to completion under conditions of time and temperature such that polymer linkages derived from anhydride moieties are predominantly amic-acid linkages;
(b) heating the solution obtained in (a) under conditions of time and temperature sufficient to obtain a solution wherein the condensation product present in said solution has undergone conversion to a polyamide-imide such that greater than about 90% of said polymer linkages derived from anhydride moieties are imide linkages; and
(c) continuing heating of the polyamide-imide solution obtained in step (b) until said polyamide-imide has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

In a further method aspect, the invention is further directed to a process for manufacturing polyamide-imide resin from trimellitic anhydride and toluene diisocyanate which comprises reacting, in a solvent in the presence of a suitable catalyst, toluene diisocyanate and trimellitic anhydride in a mole ratio of from about 0.95:1 to about 1.01:1 at a temperature in the range of from about 150° C. to about 200° C. to obtain a solution comprising the dissolved amide-imide polymeric condensation product of said reactants in said polar solvent, wherein the reaction is conducted until at least about 90% of polymer linkages derived from anhydride groups are imide linkages, and the amide-imide condensation product has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

The above-defined resin preparation methods involve solution imidization, thus obviating the need for additional steps of precipitating intermediate polyamic acid resin and curing such intermediate resin to imidize amic-acid groups.

In a different method aspect, the present invention is directed to an improved process for solution-spinning heat-resistant polyamide-imide fiber having tenacity of at least about 1.5 and elongation of at least about 10%, such process generally comprising injection, through a spinneret into a liquid or gaseous fiber-forming medium, of a polymer solution comprising polyamide-imide resin dissolved in a polar organic solvent, where the polymer solution and fiber-forming medium are such that the polyamide-imide resin is essentially insoluble in the fiber-forming medium, such that upon injection of the polymer solution through the spinneret, said solvent diffuses from the polymer solution to the fiber-forming medium resulting in fiber formation; wherein the improvement comprises: injecting through said spinneret a polyamide-imide solution in which the polyamide-imide resin comprises the polymeric condensation product of reactants selected from the group of reactant pairs consisting of (a) trimellitic anhydride and toluene diisocyanate and (b) trimellitic anhydride chloride and toluene diamine, wherein greater than about 90% of polymer linkages derived from anhydride groups are imide linkages, and said polymeric condensation product has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

In a preferred solution-spinning method, the present invention is directed to a continuous solution-spinning process for producing heat-resistant polyamide-imide fiber having tenacity of at least about 1.5 grams per denier and elongation of at least about 10 percent, wherein the process comprises the following steps in continuous sequence:

(a) injecting through a spinneret, into a liquid or gaseous fiber-forming medium, a polymer solution comprising polyamide-imide resin dissolved in a polar solvent, said polymer solution and fiber-forming medium being such that the polyamide imide-resin is essentially insoluble in the fiber-forming medium, and that upon injection of the polymer solution through the spinneret, said solvent diffuses from the polymer solution to the forming medium resulting in formation of polyamide-imide fiber;

(b) removing liquid from the fiber; and (c) drawing the fiber at a temperature above the glass transition temperature of the polyamide-imide resin;

wherein the polyamide-imide resin comprises the polymeric condensation product of reactants selected from the group of reactant pairs consisting of (a) trimellitic anhydride and toluene diisocyanate and (b) trimellitic anhydride chloride and toluene diamine, wherein greater than about 90% of polymer linkages derived from anhydride groups are imide linkages, said polymeric condensation product having an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3. By a critical selection of drawing conditions in accordance with the present invention, as will be discussed more fully below, the spinning process of the present invention can be tailored to obtain heat-resistant fiber which is either suitable for apparel i.e., having lower strength and shrinkage, but higher comfort; or suitable for industrial applications such as filter media textiles, or fibers used in densified insulation panels, where maximum strength and (in some applications) the ability to undergo a certain degree of shrinkage take precedence over the fiber's wearing comfort.

Fiber prepared according to the present invention can be incorporated in a wide variety of commercial products for attainment therein of excellent heat resistance. Therefore, the present invention is also directed to heat-resistant woven and non-woven textile-containing products which incorporate the polyamide-imide fiber of the present invention.

DETAILED DESCRIPTION

Generally speaking, the fiber grade resin of the present invention, and the fiber obtained therefrom, comprise the polymeric condensation product of either the reactant pair trimellitic anhydride chloride ("TMAC") and toluene diamine ("TDA") or the reactant pair trimellitic anhydride ("TMA") and toluene diisocyanate ("TDI"). The reaction pathway leading to the amide-imide polymer of the present invention based upon either reactant pair can be generally represented as follows:

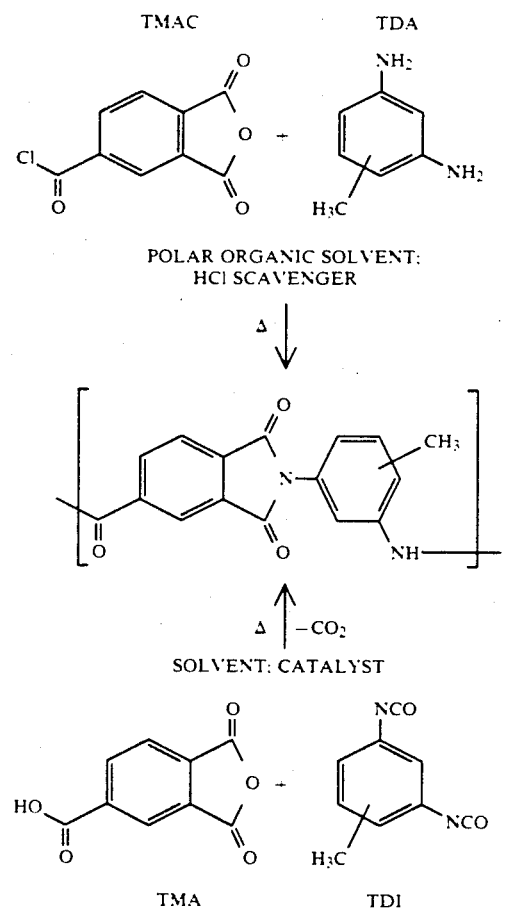

The fiber grade amide-imide resin of the present invention can also contain minor amounts of other units derived from other diamines such as hexamethylene diamine, meta-phenylene diamine, oxybisaniline, methylene bisaniline, or the corresponding diisocyanates. If desired, a further reduction in the cost of the resins of the present invention can be realized by incorporation of minor amounts aromatic or aliphatic diacids such as terephthalic acid, isophthalic acid or adipic acid. In accordance with the present invention's discovery of inherent viscosity and molecular weight properties found to be critical for the attainment of resin suitable for solution-spinning, the resin of the present invention comprising TMAC-TDA or TMA-TDI polyamide-imide must have inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

If the inherent viscosity is below about 0.3, the resin is generally difficult to spin due to brittleness which causes extensive fiber breakage during attempts to solution-spin the resin. At inherent viscosities above about 1.3 the resin generally shows an increasing amount of crosslinking which results in resin which spins poorly (or not at all) due to formation of gels, and which causes any fiber obtained from the resin to have poor physical properties generally considered unacceptable for commercial grades of fiber, (i.e. tenacity less than about 1.5 grams per denier and elongation less than about 10%). The number average molecular weight ($M_n$) of the resin must be at least about 5000 in order to obtain inherent viscosities high enough to facilitate spinning. At $M_n$'s below about 5000, the fiber is difficult or impossible to spin due to the inability of the forming fiber to hold together in a solution-spinning line. To the extent any fiber can be spun at all, it is found to be exceedingly weak with poor elongation properties. The $M_w/M_n$ is critical in the present invention because at values below about 1.7 or above about 3.3 the resin is found to be generally difficult or impossible to solution-spin. Finally, the value of $M_z/M_w$ is a measure of crosslinking in the resin. At ratios of $M_z/M_w$ of greater than about 2.3, the fiber was discovered to be difficult or impossible to spin and any fiber which could be spun had poor tenacity and elongation. For purposes of the present invention, resin may be considered "fiber grade" if it can be solution-spun into fiber having tenacity of at least about 1.5 grams per denier and elongation of at least about 10%.

TMA-TDI polyamide-imide resin according to the present invention preferably has an inherent viscosity in the range of from about 0.5 to about 0.9 dl/g; an $M_n$ in the range of from about 5000 to about 10,000 g/mole; a ratio of $M_w/M_n$ in the range of from about 2.1 to about 2.6; and a ratio of $M_z/M_w$ in the range of from about 1.7 to about 2.3; while TMAC-TDA polyamide-imide resin according to the invention preferably has inherent viscosity in the range of from about 0.7 to about 1.0 dl/g; an $M_n$ of from about 9000 to about 14,000 g/mole; a ratio of $M_w/M_n$ in the range of from about 2.0 to about 3.0; and a ratio of $M_z/M_w$ of from about 1.6 to about 2.0. These ranges are preferred because they can result in TMAC-TDA or TMA-TDI resins capable of being spun into fiber having tenacity generally in the range of about 3.0 to about 4.5 and elongation in the range of from about 20 to about 30%.

For purposes of the present invention, inherent viscosity is measured in accordance with the analytical procedures described in Example B below, while the molecular weight averages $M_n$, $M_w$ and $M_z$ are determined using the procedures described in Example A. The measurement of tenacity, modulus and elongation of fibers produced in accordance with the present invention is to be carried out in accordance with ASTM procedure D-2256.

The criticality of the inherent viscosity and molecular weight characterisitics of the polyamide-imide resin of the present invention, and the heat-resistant fiber obtained therefrom, is unexpected and could not have been predicted from the prior art. In particular, Rochina et al. U.S. Pat. No. 3,717,696, disclosing heat-resistant fibers based on polyamide-imides obtained from the reaction of trimellitic anhydride and aromatic diisocyanates, states that such polyamide-imides "must have an inherent viscosity greater than 0.4 but preferably not greater than 1.6". This patent, apart from failing to disclose a polyamide-imide heat-resistant fiber based on toluene diisocyanate, makes no mention of molecular weight properties in the amide-imide resin. Although a person skilled in the art could conclude from Rochina '696 that the only important resin property (from the standpoint of fiber manufacture) is inherent viscosity, we have now discovered, with respect to fiber derived from TMA-TDI and TMAC-TDA polyamide-imide resins, that the attainment of good fiber properties requires adherence not only to a desired inherent viscosity but also adherence to a critical profile of molecular weight characteristics, namely, number average molecular weight ($M_n$), the ratio of weight average molecular weight to number average molecular weight ($M_w/M_n$), and the ratio of z-average molecular weight to weight average molecular weight ($M_z/M_w$). In support of the present invention, we discovered that a polyamide-imide resin prepared from TMAC and TDA and having an inherent viscosity of 1.0 (within the 0.4 to 1.6 inherent viscosity range of Rochina et al '696) could not be spun into fiber (see Comparative Example 2 hereof), while a TMAC-TDA resin having inherent viscosity of 0.33 (outside of the inherent viscosity range disclosed in Rochina '696) was capable of being solution-spun to fiber having tenacity of 2.2 gpd and elongation of 26% (see Example 3 hereof).

Preparation of the fiber grade resin of the present invention from either TMAC-TDA or TMA-TDI is generally carried out using solution imidization. Polycondensation of the reactants to form a polyamic acid intermediate is carried out in an appropriate reaction solvent, followed by in situ imidization of the amic-acid groups to imide groups. In the present invention, preparation of the amide-imide resin by solution imidization is preferred over processes in which the polyamic acid intermediate is precipitated from solution and then cured to achieve imidization, because the imidized polymer solution can be used directly as the spinning solution or "dope" for spinning fiber, provided the amount of reaction solvent introduced at the outset of the polymerization reaction is calculated so that the final polyamide-imide solution has a viscosity and polymer concentration suitable for spinning. The viscosities and polymer concentrations required to obtain suitable spinning solutions in accordance with the present invention are discussed in greater detail below. Solution imidization is preferred for the further reason that the steps of precipitation and curing of the intermediate polyamic acid tends to produce resin which is crosslinked and thus poorly soluble in conventional solution-spinning solvents.

TMAC-TDA

Solution imidization of the reactant pair TMAC-TDA can be carried out by reacting trimellitic anhydride chloride ("TMAC") and toluene diamine ("TDA") in an appropriate reaction solvent and in the presence of a suitable acid scavenger in a molar ratio of from about 0.95:1 to about 1:01:1. Commercially obtained TMAC can be used in the present invention. We have discovered that TDA in the form of a mixture of the 2,4 and 2,6 isomers is excellent for preparing a TMAC-TDA resin of the present invention, which is solution spinnable to obtain fiber having tenacity of at least 1.5 grams per denier and elongation of at least 10%. Commercially obtained 20:80 mixtures of the 2,6 and 2,4 isomers of TDA can be used as received without further purification to prepare the TMAC-TDA resin of the present invention. A slight excess of TMAC in the range of from about 0.50 to about 1 mole percent has been found to maximize inherent viscosity of the resulting amide-imide resin for a given set of reactor conditions, and is thus preferred.

Suitable polar organic solvents which can be used in the present invention include dimethylformamide, dimethylacetamide, hexamethylphosphotriamide, tetramethylenesulphone, gamma butryrolactone, and preferably N-methylpyrollidone. Suitable acid scavengers, required to remove HCl which is generated in the TMAC-TDA reaction, include triethylamine, calcium carbonate and calcium oxide. The latter two form soluble salts upon reaction with HCl and are therefore preferred over triethylamine which forms an insouble salt requiring filtration of the amide-imide solution. Calcium carbonate is most preferred as an acid scavenger because its reaction with HCl to produce water (which can interfere with the polycondensation) takes place at a sufficiently slow rate that the polycondensation reaction can be conducted at about room temperature without substantial detriment thereto caused by the formation of water. Use of calcium oxide as the acid scavenger requires that the TMAC-TDA reaction be conducted at a temperature not exceeding about −20° C. due to rapid generation of water which occurs if the reaction is run at room temperature.

Reaction of the TMAC and the TDA is carried out essentially to completion at a sufficiently mild temperature, preferably about room temperature in the case when calcium carbonate is the acid scavenger, such that polymeric linkages resulting from reaction of anhydride groups and amine groups are predominantly in the form of amic-acid moieties. The reaction can be conducted by adding TMAC slowly to a reaction vessel containing TDA, solvent and the appropriate acid scavenger. Following addition of all the TMAC reactant, the reaction mixture can be stirred for about 30 minutes up to about two hours at about room temperature to essentially completely react the TMAC and TDA. Under these conditions of time and temperature, at least a majority of the polymeric linkages derived from anhydride moieties are present in the form of amic-acid linkages. Generally, while up to about 20% of the anhydride-derived linkages may be in the form of imide linkages under the above-described mild conditions, a more typical range is about 5 to 10%.

Following formation of the polyamic-acid solution as described above, the solution is then heated at a temperature within the range of from about 130° C. to about 180° C. for an amount of time sufficient to (1) convert greater than about 90%, and preferably essentially all of the amic-acid linkages, to imide linkages; and (2) continue chain extension of the amide-imide polymer until the polymer has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3. We have further determined in accordance with the present invention that TMAC-TDA resin capable of producing fiber having the best overall properties has an inherent viscosity within the range of from about 0.7 to about 1.0 dl/g; an $M_n$ of from about 9000 to about 14,000 g/mole; a ratio of $M_w/M_n$ in the range of from about 2.0 to about 3.0; and a ratio of $M_z/M_n$ of from about 1.6 to about 2.0. The time required to obtain the desired degree of imidization is generally much less than the time required to obtain the desired inherent viscosity and molecular weight characteristics. Thus, imidization can be completed in about 1 hour, whereas the chain extension of the polyamide-imide generally requires about 8 to about 14 additional hours. It is generally preferred to continue such heating until a maximum inherent viscosity is obtained. Further heating beyond this point will increase crosslinking in the polymer. Excessive crosslinking impairs the spinnability of the solution and can ultimately cause the dissolved polymer to precipitate as an insoluble gel. In most instances a maximum inherent viscosity in the amide-imide polymer can be obtained after conducting the combined imidization and chain extension heating step for a period of time in the range of from about 12 to about 15 hours. Before initiating the imidization reaction, toluene can be added to the reaction vessel so that water produced during the polymerization/imidization reactions can be stripped from the reaction vessel under nitrogen in the form of a toluene-water azeotrope. The time required to raise the temperature of the reaction vessel from the lower temperature of the polyamic-acid reaction to the higher temperature of the imidization reaction has been discovered to be a factor in maximizing inherent viscosity in the resultant amide-imide polymer in larger scale resin preparations. Shorter ramp-up times have been found to produce polymers of higher inherent viscosity than can be produced using longer times. Thus the ramp-up time should generally be as short as plant equipment constraints will allow. For example, when the temperature of imidization was reached in a period of about 30 minutes to an hour, versus several hours, an average increase of about 10% in final inherent viscosity was obtained without detracting from other resin properties.

In accordance with a further feature of the present invention, it has been found that polyamide-imides which are imidized to an extent of about 90% or less result in fibers which are not able to be considerably improved in strength when subjected to hot drawing, while the reverse is true for amide-imide resins according to the present invention which are greater than about 90% imidized. Therefore a preferred feature of the present invention, applicable to both the TMAC-TDA resin discussed here, and the TMA-TDI resin discussed in the following section, is that such resins be greater than about 90% imidized, and most preferably, essentially completely imidized. For purposes of the invention, the term "percent imidization" or like terminology refers to the percentage of reacted anhydride groups which have been converted to imide linkages. The term "essentially completely imidized" should be understood to mean a degree of imidization of from about 95 to about 100%. Degree of imidization can be determined by back titrating the polymer in a non-aqueous solution as illustrated in Example C hereof.

Upon completion of the imidization/chain extension heating step outlined above, the TMAC-TDA polyamide-imide solution can function as the fiber spinning solution or "dope" for making a TMAC-TDA fiber in accordance with the present invention; provided, however, the final solution has viscosity and polymer concentration which render the solution suitable for spinning. Broadly speaking, a spinning solution for use in the present invention has suitable viscosity if the solution is viscous enough to form long liquid filaments in a spinning coagulation bath, but not so viscous as to form a gel or require excessive pressure for injection through a spinneret. A viscosity in the range of about 300 to about 8000 poise is generally acceptable. Preferred viscosities are in the range of about 500 to about 2000 poise. For purposes of the present invention the spinning solution viscosity can be determined using a conventional falling ball apparatus in which is measured the time (t) required for a stainless steel ball 0.393 cm in diameter to cover a distance (L) during free fall through a 50 ml volumetric cylinder (inside diameter 2.24 cm)

filled with the solution. The viscosity (poise) can then be determined using the formula:

$$\text{Viscosity (poise)} = 36.8 \, (t/L)$$

where t is seconds and L is cm. Throughout this specification, and in the claims appended hereto, it should be understood that all references to viscosity mean viscosity as measured at room temperature. Polymer concentrations which are generally suitable for spinning solutions of the TMAC-TDA resin are in the range of from about 12 to about 40 wt. % polymer based on the total weight of the solution. A preferred polymer concentration is from about 25 to about 35 wt. % of the solution. To facilitate a continuous manufacturing operation, it is desirable to conduct the TMAC-TDA reaction in an initial amount of solvent calculated to result in a final polyamide-imide solution having the desired target viscosity and concentration.

TMA-TDI

In addition to resin based upon the reaction of TMAC and TDA, the present invention is further directed to resin comprising an amide-imide polymer which is isostructural with the TMAC-TDA resin, but which is obtained by reacting trimellitic anhydride ("TMA") and toluene diisocyanate ("TDI"). Preparation of the TMA-TDI resin can be carried out by reacting TDI and TMA in a mole ratio of from about 0.95:1 to about 1:01:1, in a solvent in the presence of a suitable catalyst, at a temperature in the range of from about 150° C. to about 200° C., until there is obtained a solution of amide-imide polymer which is greater than about 90% imidized and which has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3. We have further discovered in accordance with the present invention that TMA-TDI resin capable of producing fiber having the best overall properties has an inherent viscosity of from about 0.5 to about 0.9 dl/g; an $M_n$ in the range of from about 5000 to about 10,000 g/mole; a ratio of $M_w/M_n$ in the range of from about 2.1 to about 2.6; and a ratio of $M_z/M_w$ in the range of from about 1.7 to about 2.3.

A slight molar excess of TDI versus TMA is preferable for obtaining polymer in which inherent viscosity is maximized. Suitable solvents are as described for the TMAC-TDA preparation, N-methylpyrollidone being preferred. Suitable catalysts for the TMA-TDI reaction include methanol, water, phosphorous compounds such as 3-methyl-1-ethyl-3-phospholene-1-oxide and diamine compounds such as triethylenediamine-1,4-diazobicyclo[2.2.2]octane. Resin having excellent properties for fiber spinning was prepared using methanol as the reaction catalyst in an amount within the range of from about 1 to about 10 mole % based on moles of TMA, and preferably within the range of from about 3 to about 7 mole %.

In the preparation of the TMA-TDI resin of the present invention, TDI preferably used in the form of a 20:80 mixture of the 2,6 and 2,4 isomers has been discovered to be excellent for the preparation of resin which is suitable for spinning into heat resistant fiber having tenacity of at least 1.5 grams per denier and elongation of at least about 10%. This is considered unexpected and non-obvious given that the technical paper of Allard and Pigeon, discussed above in the Discussion of Background Art, discloses use of either the 2,4 isomer of toluene diisocyanate or the 2,6 isomer thereof (see Table 2 of the Allard et al publication). The cited paper states that only isocyanates having two benzene nuclei are capable of producing spinnable resin. Thus, from the total disclosure in the paper, it appears that the authors of the paper were not able to prepare a satisfactory fiber grade resin using the 2,6 or the 2,4 isomer of TDI. The ability of the present invention to successfully employ mixtures of the 2,6 and 2,4 isomers, and preferably a commercially obtained 20:80 mixture of isomers, in the preparation of a spinnable TMA-TDI resin, is therefore considered surprising and unexpected.

It has been found that in order to obtain TMA-TDI resin having superior properties for fiber spinning, the reaction of TMA and TDI should preferably be carried out in a gradual or staged fashion. For example, at the outset of the reaction, TDI should be added slowly over a period of from about 1 to about 3 hours to a reaction vessel comprising the trimellitic anhydride, solvent and catalyst. During the TDI addition, and for a period of about 1-6 hours thereafter, the reaction vessel should be maintained at a temperature within the range of about 75° C. to about 95° C. Following this stage, the temperature of the reaction vessel should be increased to about 120° C. to about 150° C. and maintained there for about 2 to about 6 hours. Upon completion of this second stage of heating, the temperature should again be increased from about 160° C. to about 200° C. and maintained there for about 4 to about 8 hours. While the foregoing describes a staged reaction, it is also possible to achieve similar results using a procedure in which the temperature is gradually increased instead of being ramped up in discrete increments. In either case it is important that the reaction be conducted at such a controlled rate and for a period of time such that formation of polymer gels, indicating undesirable crosslinking, is avoided, and the required inherent viscosity and molecular weight values are achieved.

The solution of TMA-TDI polyamide-imide obtained at the completion of the above staged process can be used directly as a solution-spinning dope, provided the amount of solvent present at the beginning of the preparation is such as will result in a final solution having a viscosity of about 300 to about 8000 poise and a polymer content of about 25 to about 35 weight %. A preferred TMA-TDI spinning solution is one having a viscosity in the range of about 500 to about 2000 poise and a polymer content of about 25 to about 35 wt. % based on the weight of the solution.

Fiber Preparation

The TMAC-TDA and TMA-TDI polymer compositions and methods for their preparation described above can be used to obtain polymer solutions which are excellent for solution-spinning high quality, heat-resistant fiber. Accordingly, the present invention is further directed to fiber having tenacity of at least 1.5, and preferably at least about 2.5 grams per denier, and elongation of at least about 10%, and preferably at least about 20%, where such fiber is solution-spun from the TMAC-TDA or TMA-TDI resin compositions described above, i.e., resins having an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

As concerns production of heat-resistant fiber from the TMA-TDI and TMAC-TDA resins described above, the present invention is further directed to an improved process for solution-spinning heat-resistant polyamide-imide fiber having tenacity of at least about 1.5 and elongation of at least about 10%. The spinning process in general terms comprises injection through a spinneret into a liquid or gaseous fiber-forming medium, of a polymer solution comprising polyamide-imide resin dissolved in a polar organic solvent, wherein the polymer solution and fiber-forming medium are such that the polyamide imide-resin is essentially insoluble in the fiber-forming medium, whereupon, following injection of the polymer solution through the spinneret, the polar solvent diffuses from the polymer solution to the forming medium resulting in precipitation or coagulation of a fiber. The improvement in the process comprises injecting through the spinneret a polyamide-imide solution in which the polyamide-imide resin comprises the polymeric condensation product of reactants selected from the group of reactant pairs consisting of (a) trimellitic anhydride and toluene diisocyanate and (b) trimellitic anhydride chloride and toluene diamine, wherein greater than about 90% of polymer linkages derived from anhydride groups are imide linkages, and said polymeric condensation product has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

In accordance with the present invention, it has been further discovered that conducting hot drawing of the solution-spun fiber in a fiber spinning process in which fiber formation, washing, drying and hot drawing of the fiber, are carried out in a single continuous manufacturing operation, enables production of fiber having markedly improved tenacity as compared to processes in which the as-spun fiber is washed, collected and dried, but not hot drawn until a later date as a separate operation distinct from fiber production. While not wishing to be bound to any particular theory that might explain this phenomenon, it is postulated that freshly spun and washed fiber still carries some residual solvent trapped in micropores of the fiber, which may have a plasticizing effect during drawing, permitting better alignment of the polymer chains, thus resulting in the observed significant enhancement in fiber tenacity when hot drawing is conducted immediately after the as-spun fiber is washed and dried. In view of this discovery, the present invention is further directed to a continuous process for producing a heat-resistant polyamide-imide fiber having tenacity of at least about 1.5 grams per denier and elongation of at least about 10 percent, where the process comprises continuously carrying out in the following sequence the steps of (a) spinning a solution of the above-described TMA-TDI or TMAC-TDA polyamide resin to form a fiber; (b) removing excess liquid from the fiber; and (c) drawing the fiber at a temperature above the glass transition temperature of the TMA-TDI or TMAC-TDA polyamide-imide resin.

In somewhat greater detail, a wet solution-spinning process according to the present invention, utilizing the TMA-TDI or TMAC-TDA resin solutions described earlier, can be conducted in the following manner: The polymer solution, or dope, can be kept in a stainless steel dope vessel pressurized by nitrogen at a pressure sufficient to provide good flow to a metering pump. A pressure of about 20-60 psi was found to be sufficient. The metering pump feeds the dope through filtering means to remove any particulate impurities that may be present in the polymer dope, thus improving the overall quality of the fiber. In the present invention, sintered metal filters were employed having a filter pore diameter of 5 to 10 microns. After passing through the filtering means, the dope under pressure from the metering pump is injected through a stainless steel multiple hole spinneret immersed in a coagulation bath. The coagulation bath can be maintained at about room temperature up to about 60° C. If the coagulation bath temperature is too low, the fiber will form at a desirable rate, but resultant higher tension in the spinning line will increase the likelihood of fiber breakage. If the temperature is too high the fiber forms too slowly and the process cannot be run. Spinneret hole sizes ranging from about 50 to 150 micron diameter, and hole counts between 20 and 300 holes can be used depending on the desired total denier and denier per filament. Larger hole counts may also be used, especially for making staple product.

Ideally, the coagulation bath should employ a solvent, or combination of solvents, such that the dope solvent should not diffuse out of the forming fiber and into the coagulation bath at a rate faster than the rate at which the coagulation bath solvent (which is a non-solvent for the fiber) can diffuse into the micro- and macrovoids of the fiber created by the escaping dope solvent. The rate of solvent diffusion and resultant fiber formation is too rapid when water is utilized as the sole coagulation bath solvent. Fiber precipitated in water, although formed quickly, is found to have an undesirable amount of porosity. A coagulation bath of water containing about 50 to 65 volume percent N-methylpyrollidone is preferred because it results in fiber essentially free of undesired macrovoids and fingers, yet the period of time required for the fiber to coagulate in the bath is not so long as to render the processing commercially unacceptable from a production standpoint. While ethylene glycol is also an excellent solvent for the coagulation bath, a solvent system based on NMP and water is preferred due to the greater ease of solvent recovery. It is within the skill of the art to select other solvents suitable for use in the solution-spinning coagulation bath.

Upon exiting the coagulation bath, the coagulated filaments can be taken up on a first set of rollers while a water spray is applied to the rollers to begin the removal of solvent from the as-spun fiber. After the first set of rollers, the fiber can be passed through a boiling water bath to remove excess dope solvent, coagulation bath solvent, and, in the case where the fiber is prepared from TMAC-TDA, dissolved $CaCl_2$. After the boiling water bath, the fibers can be taken up by a second set of rollers rotating at about the same rate as the first set or slightly faster to obtain a small amount of tension in the line which facilitates production. If the as-spun fiber is to be hot drawn immediately, as required according to one feature of the present invention, the above-mentioned second set of rollers can be heated to remove residual liquid from the fiber prior to drawing. The temperature of the heated rollers, and the number of windings of the fiber around the rollers, can be adjusted in a conventional manner to reduce the residual liquid in the as-spun fiber to a level that is suitable for hot drawing. At too high a level of residual liquids, the fiber will have a tendency to break during drawing. If too much liquid is removed, the fiber will be difficult to process in the drawing step due to static electricity.

As pointed out above, hot drawing of the as-spun fiber immediately after spinning and washing results in better fiber tenacity. The purpose of drawing is to consolidate the fiber (by collapsing voids formed during the coagulation stage), to increase crystallinity, and to orient the polymer chains along the fiber's axis in order to maximize its tensile properties. Hot drawing can be done by passing the fiber through a furnace and taking it up on a set of rollers rotating at a higher speed than the set of rollers feeding the as-spun fiber into the drawing furnace. The furnace temperature will depend on the fiber size and line speed, but in all cases should be above the fiber's glass transition temperature of about 330° C. and generally in the range of from about 350° C. to about 500° C. At temperatures below the glass transition temperature, the above-noted advantages associated with hot drawing are minimally obtained. While the draw ratio can vary between about 2X and 10X, the best improvement in fiber properties is obtained at the maximum draw ratio the fiber can tolerate before showing an unacceptable amount of breakage during drawing. In most cases, draw ratios between about 4X and 8X were determined to be suitable for drawing the as-spun fiber of the present invention. Final collection of the drawn fiber can proceed in a conventional manner.

In accordance with a feature of the present invention, the drawing temperature of the TMAC-TDA or TMA-TDI fiber is critical with respect to the intended end use of the fiber. Drawing at temperatures within the range of about 350° C. to about 400° C., and preferably about 375° C. to 400° C., results in fiber having higher strength and greater shrinkage than fiber drawn at temperatures within the range of from about 400° C. to about 500° C., and preferably about 410° C. to about 450° C. At the higher drawing temperature, fiber is obtained which is excellent for heat-resistant apparel. At the lower temperature fiber is obtained which has excellent characteristics for industrial applications such as filter media (high strength) or densified insulation panels (where shrinkage is desired). While shrinkage is generally not desired in filtration applications, it is found that the tendency of the higher strength fiber drawn at the lower temperature range to show increased shrinkage does not become evident until temperatures which generally exceed the maximum use temperatures encountered in filtration applications.

In the process generally described above, line speeds can be adjusted in a manner generally within the skill of the art. Line speeds of from about 1 to about 5 meters/minute at the coagulation bath exit, and about 10 to 40 meters/minute at the point of final collection were found to be acceptable for spinning fiber in accordance with the present invention.

The amide-imide fiber of the present invention can be used to manufacture a wide variety of woven and non-woven textile or paper products having heat resistant characteristics, for example: woven, knitted or felt bags for gas filtration; heat resistant protective clothing, gloves, aprons, etc.; sewing thread; felts for fibrous thermal insulation materials; papermaker felts; heat resistant packing, gasketing, pipewrap, and braiding; interior fabrics for wall coverings, carpeting, furniture upholstery, curtains in airplanes, theaters, hotels, hospitals, etc.; heat resistant cordage; rigidified panels for thermal, fire, and acoustic structural insulation; paper for electrical insulation; paper for honeycomb composites. This list of potential applications is intended to be illustrative only. Those skilled in the art will appreciate all the attendant advantages of the fiber of the present invention in numerous additional applications where it is desired to impart excellent heat resistance.

The following examples are provided only for the purpose of illustration and are not intended to limit the invention defined in the appended claims.

EXAMPLE A

This example describes the analytical method used herein to determine molecular weight averages ($M_n$, $M_w$ and $M_z$) of the TMAC-TDA and TMA-TDI polyamide-imide polymers of the present invention. The method employed is liquid size exclusion chromatography, also referred to as gel permeation chromatography or "GPC". In the following examples, GPC molecular weight averages were determined according to the procedure outlined in this example. In general terms, the technique, which is well-known in the art, involves injecting a solution of polymer sample into a chromatographic column packed with a solid, porous substrate which separates the molecules according to their size in solution. The size-separated molecules are then detected and recorded according to their concentration as a function of elution time. The treatise by W. W. Yau, et al. entitled "Modern Size-Exclusion Liquid Chromatography," John Wiley and Sons, New York, 1979, may be referred to for a detailed discussion of the theory and practice of this analytical method.

As is well known, GPC is not an absolute method for determining molecular weight, but requires calibration of the GPC instrument against standard reference samples having known molecular weights as determined by such absolute methods as NMR or vapor pressure osmometry. For purposes of the present invention, calibration of the GPC instrument was carried out in a conventional manner based on the procedure described by A. C. DeKok et al. in Journal of Liquid Chromatography, 5 (5), 807–817 (1982). Although the calibration procedure described in this article was applied to GPC molecular weight determinations on linear polyethylenes, the procedure can also be used to obtain a GPC calibration curve suitable for obtaining molecular weight determinations on polamide-imides. Generally speaking, the technique described by DeKok et al. involves the initial step of performing a universal calibration of the GPC instrument using polystyrene standards of known narrow molecular weight distribution. Universal calibration using polystyrene standards is well known to the skilled practitioner familiar with GPC molecular weight determinations and therefore need not be set forth in detail here. The resulting calibration curve correlates molecular weight of the polystyrene standards to retention time in a well known manner. The next step is to utilize the GPC instrument to obtain GPC data on several different broad molecular weight samples of amide-imide polymer of the type which the instrument will ultimately be used to analyze, (hereinafter referred to for convenience as "subject polymer") where the $M_n$ of each different sample of the subject polymer has already been determined using an absolute molecular weight method such as $^{13}C$ NMR. Using the polystyrene universal calibration curve, and the GPC traces obtained for the subject polymer samples of known $M_n$, a retention time can be assigned to each of the known $M_n$ values, thus allowing one to obtain a segment of the calibration curve for the subject polymer. Unfortunately, only a segment of the subject polymer's calibration curve can be obtained in this manner due to the limitations in the ability of $^{13}$C NMR to obtain molecular weights for higher molecular weight amide-imide polymers. However, by using calculations described in the above referenced journal article by A. C. DeKok et al., a formula can be derived which expresses the mathematical relationship (hereinafter referred to as a "shift factor") between the polystyrene calibration curve and the calibration curve segment obtained for the subject polymer such that, at a given retention time, the molecular weight of the subject polymer can be readily calculated from the polystyrene molecular weight at that retention time. By applying the derived formula to the entire polystyrene calibration curve, one can extend the calibration curve segment obtained for the subject polymer to obtain the full calibration curve for the subject polymer. It is important to note that, for purposes of the present invention, the shift factor which was used to convert the polystyrene calibration curve to the calibration curve ultimately used to determine $M_n$ of the TMAC-TDA or TMA-TDI amide-imide polymers of the present invention was as follows:

$$MW_{ai} = 0.0494 \, (MW_{ps})^{1.1134}$$

where the term "$MW_{ai}$" refers to a molecular weight value of the amide-imide polymer on the amide-imide calibration curve and the term "$MW_{ps}$" denotes a polystyrene molecular weight point on the polystyrene calibration curve. The entire calibration curve for the polyamide-imide can be obtained by fitting log ($MW_{ai}$) to a third order polynomial in retention time.

GPC molecular weight determinations on the amide-imide polymers of the present invention were performed on a Hewlett-Packard Model 1090 high performance liquid chromatograph. Instrument control and data reduction were performed by an H-P 85B computer using software supplied by Hewlett-Packard. The GPC column consisted of two Shodex A-80/MS, 25 cm length columns covering a range of about $1.0 \times 10^7$ to 600 molecular weight for polystyrene. The mobil phase is N,N-dimethylacetamide (DMAC) with 0.1M LiBr added to compensate for possible polyelectrolyte effects. Polymer samples were made by dissolving 10 mg of polymer in 30 ml of DMAC/0.1M LiBr solvent. The UV detector was operated at 280 nm.

Using the amide-imide calibration curve obtained in the above described manner, raw GPC data which can be plotted as a bell-shaped curve of sample concentration versus elution time, were used to calculate the number average ($M_n$), the weight average ($M_w$), and the z-average ($M_z$) of the polyamide-imide sample in a conventional manner.

As is well-known in the art, the raw data GPC curve of sample concentration versus elution time obtained in the procedure generally outlined above can, with the use of the calibration curve described above, provide a polymer's molecular weight distribution (i.e., the statistical distribution, according to their molecular weight, of the individual polymer molecules that make up the polymer sample). The number average molecular weight, $M_n$, provides a molecular weight value corresponding to the average chain length in a polymer sample. $M_n$ is defined in the art as the mass of the sample in grams $\Sigma W_i$, or $\Sigma N_i M_i$, divided by the total number of chains present N, which is $\Sigma N_i$, where $W_i$ and $N_i$ are the weight and number of molecules of molecular weight $M_i$, respectively, and i is an integer which labels each molecular weight in the system. The symbol $\Sigma$ indicates summation over all possible i's. Thus, $$M_n = \frac{\Sigma N_i M_i}{\Sigma N_i}$$

The weight average molecular weight, or $M_w$, is a measure of the breadth of the polymer molecular weight distribution. The formula known in the art for determining the $M_w$ is:

$$M_w = \frac{\Sigma N_i M_i^2}{\Sigma N_i M_i}$$

The z-average molecular weight, $M_z$, is used to provide information on how the molecular weight distribution is skewed, i.e., how the molecular population is distributed at the high and low molecular weight ends of the molecular weight distribution curve, and whether these two tails of the curve are equally populated. The value for $M_z$ gives one an idea of the extent of higher molecular weight species in the polymer system. Insofar as crosslinked polymer chains have abnormally high molecular weight, $M_z$ and $M_z/M_w$ can be used to quantify the extent of crosslinking. The formula for $M_z$ is:

$$M_z = \frac{\Sigma N_i M_i^3}{\Sigma N_i M_i^2}$$

A more extensive discussion of $M_n$, $M_w$ and $M_z$ can be found in the treatise Yau et al. "Modern Size-Exclusion Liquid Chromatography" referred to above.

EXAMPLE B

This example describes the procedure used for determining inherent viscosity of the polyamide-imide resins of the present invention. Generally, the procedure is in accordance with ASTM D-2857. The polyamide-imide sample was prepared for viscometric analysis by weighing 0.125 g±0.001 g of the polymer into a 27 mm×95 mm glass vial. To the vial were added 25 ml of N-methylpyrrolidone solvent. The NMP solvent was prepared by placing 300 ml of molecular sieves, 8-12 mesh, 4 A, into a 1 gal. bottle. The bottle was then filled 90% full with NMP having 99.5% min. purity grade and moisture content of <0.05%. The bottle was capped loosely and swirled every 15-30 minutes over a 2-3 hour period. The bottle was then capped tightly and allowed to stand overnight. After placing the NMP solvent in the glass vial, the vial was lightly capped and heated until the temperature of the solvent was 105° C. for a period of 1-4 hours to dissolve the polymer in the solvent. The inherent viscosity was determined using an uncalibrated type 100 Cannon-Ubbelohde viscometer hung in a constant temperature bath of 25° C.±0.05°. First the NMP solvent alone was run through the viscometer by filling the viscometer to a level between the level lines on the viscometer's large reservoir bulb. Vacuum was applied to the viscometer to draw the solvent up the capillary tube of the viscometer until the solvent partially filled the bulb above the uppermost graduation of the capillary tube. The vacuum was then removed and the timer started as the meniscus passed the uppermost graduation. The timer was stopped as the meniscus passed through the lowermost graduation of the capillary tube. The time elapsed was recorded in seconds, and the procedure was repeated three times to obtain an average solvent efflux time ("t₀"). The three consecutive readings should agree within 0.2 seconds. In the same manner the efflux time was determined for the polymer solution and recorded as ("t"). The inherent viscosity, "IV" was then determined using the formula:

$$IV(dl/g) = \frac{\ln V_r}{C}$$

where:

$V_r = t/t_0$
$C$ = polymer solution concentration, g/dl.

In the Examples below, the following abbreviations are used: Trimellitic anhydride chloride ("TMAC"); trimellitic anhydride ("TMA"); toluene diamine ("TDA"); toluene diisocyanate ("TDI"); N-methylpyrrolidone ("NMP"); inherent viscosity ("IV"). All examples employing TDA utilized a commercially obtained mixture (80:20) of the 2,4 and 2,6 isomers.

EXAMPLE C

The purpose of this example is to illustrate the titration procedure suitable for use in the present invention for determining percent imidization of the polyamide-imide resins of the present invention. Although the procedure is shown for a TMAC-TDA polymer, the procedure is also applicable to TMA-TDI resins of the present invention.

A 0.1N solution of sodium methoxide in methanol is prepared by dissolving sodium methoxide (8.2 g) in dry methanol (1500 mL). The solution is standardized by titration of a 25-mL aliquot with standard 0.1N HCl using phenolphthalein as the indicator. The normality of the solution is calculated according to equation 2.

$$N_{NaOCH_3} = \frac{(mL \text{ aqueous } HCl)(0.11 N)}{25 \text{ mL}} \quad (2)$$

An accurately weighed sample of polymer (approximately 2.0 g) is dissolved in 70 mL of NMP at room temperature. Two drops of indicator (a 1% solution of Thymol Blue in N,N-dimethylacetamide) are added and the solution is titrated to a reddish endpoint with the 0.1N solution of sodium methoxide in methanol. A 70 mL sample of NMP containing the same amount of indicator is also titrated with the sodium methoxide solution as a blank. The milliequivalents of carboxylic acid per gram of polyamide-imide are calculated according to equation 3. (Note that the calculation assumes that the concentration of acid end groups and other acidic impurities is negligible.)

$$\frac{meq \, COOH}{g \, polymer} = \frac{[(mL \text{ of NaOCH}_3 \text{ solution}) - (mL \text{ of blank})](N_{NaOCH_3})}{sample \text{ weight (grams)}} \quad (3)$$

This number is converted to percent imidization according to equation 4.

$$\text{Percent Imidization} = \frac{(3.38) - (meq \, COOH/g)}{3.38} \times 100 \quad (4)$$

The value used in determining the percent imidization depends on the polymer being titrated. In the case of TMAC-TDA the polyamic acid formed from TMAC and TDA has a repeat unit with a molecular weight of 296.28 g/mole. For the polyamic acid (i.e., the completely unimidized polymer), one would expect one molar equivalent of COOH per mole of the repeat unit, or one milliequivalent of COOH per 0.29628 gram of polymer. Thus, 1/0.29628 = 3.38.

It should be noted that endpoint determination in the titration procedure described above can be subject to possible error due to difficulty in making an exact determination of where the titration endpoint has occured. For purposes of the present invention, it is contemplated that the above described method, or any other titration method having greater accuracy than that described above, can be used to determine imide content in the resins of the present invention.

COMPARATIVE EXAMPLE 1

A 16-gallon, stirred tank batch reactor, equipped with an overhead condenser, was charged at room temperature with NMP (65 lbs), and TDA (6.95 lbs, 25.8 mol). Subsequently, TMAC (12.24 lbs, 26.3 mol) was added over a period of 2 hr. and 50 min. During TMAC addition, the reactor was maintained at a temperature below 50° C., by means of a cooling coil. After TMAC addition was complete, CaO slurry in NMP (1.78 lbs CaO and 10 lbs of NMP) was added into the reactor. The mixture was stirred for another 40 min., while being maintained at a temperature between 39°-48° C., after which the reactor temperature was increased, with the help of a heating mantle, to 204°-207° C., over a period of 4 hrs. The reactor was maintained at this temperature for 4 hrs. The volatiles (NMP and water) were removed by nitrogen sweep and condensed (total condensate weight 3.56 lbs.) in the overhead condenser. At this point, heating stopped and the reactor was allowed to cool down to room temperature. Once cooled, the viscous reaction solution was diluted with 14.58 lbs of NMP and the mixture was heated to 93° C., while stirring. After 2 hrs., the reaction product (13% solids in NMP) was discharged through a valve outlet. Part of the solution was precipitated in methanol in a blender. The yellow powder was isolated by Buchner filtration. The powder was resuspended in methanol, blended, and treated three more times with methanol, then dried at 100° C. under vacuum overnight. The polymer's IV was 0.26 dl/g. The $M_n$, $M_w$ and $M_z$ were determined by GPC to be 2200, 3690, and 5745 g/mol, respectively. The reactor solution obtained above containing 13% solids was subjected to a fiber-forming test: The solution was placed in a jar and was lifted with the help of a glass rod and allowed to fall freely. Upon doing this it formed long liquid filaments, free of gels; this indicated that the solution concentration was suitable for spinning. When the liquid filaments were allowed to solidify by precipitating them in jars containing water, the resulting solid filaments were extremely brittle and pulverized upon handling, indicating that the particular resin did not have $M_n$ large enough to form continuous solid filaments.

EXAMPLE 1

A 16-gallon, stirred tank batch reactor, equipped with an overhead condenser, was charged at room temperature with NMP (65 lbs), and TDA (5.08 lbs, 18.9 mol). Subsequently, TMAC (8.95 lbs., 19.2 mol) was added over a period of 2 hr. and 50 min. During TMAC addition, the reactor was maintained at a temperature below 50° C., by means of a cooling coil. After TMAC addition was complete, CaO slurry in NMP (1.78 lbs CaO and 10 lbs of NMP) was added into the reactor. The mixture was stirred for another 2 hrs. and 15 min. and the temperature was allowed to increase to 71° C. At that point 9 lbs. of toluene were added and the reactor temperature was increased, with the help of a heating mantle, to 160° C., over a period of 1 hr. and 20 min. The reactor was maintained at a temperature of 160° C.-170° C. for 2 hrs. and then was heated to 204° C. for another 1 hr. and 30 min. The volatiles (NMP, water and toluene) were removed by nitrogen sweep and condensed. At this point, heating stopped and the reactor was allowed to cool down to room temperature. Once cooled, the viscous reaction solution was discharged through a valve outlet. Part of the solution was precipitated in methanol in a blender. The yellow powder was isolated by Buchner filtration. The powder was resuspended in methanol, blended, and treated three more times with methanol, then dried at 100° C. under vacuum overnight. The polymer's IV was 0.36 dl/g (NMP). The $M_n$, $M_w$ and $M_z$ were determined by GPC to be 6500, 15085, and 26920 g/mol, respectively. The polymer's imide content was greater than 96%. The concentration of the resin solution prepared above was adjusted to 40 wt. % resin, and the solution was placed in a 5 ml syringe. The solution was extruded by means of a syringe pump through a 20 ga. needle (250 micron in diameter) into an ethylene glycol coagulation bath; the resulting single fiber was taken-up continuously at a speed of 0.6 m/min. The collected single fiber was washed in distilled water, left to dry overnight, and drawn on a hot plate at 340° C., at a draw ratio equal to 5x. The drawn fiber properties were tenacity 2.5 g/den, modulus 69 g/den, and elongation 9%.

EXAMPLE 2

A one-liter, four-neck flask was equipped with a mechanical stirrer, a nitrogen inlet, and a thermocouple. The flask was purged with nitrogen, then charged with TDA (34.04 g, 0.28 mol), triethylamine (40.6 ml, 30.9 g, 0.281 mol), and NMP (500 ml). The remaining neck was equipped with an auger-driven powder-dispensing funnel charged with TMAC (59.10 g, 0.28 mol). The TMAC was added to the reaction solution at −25° C. over a forty-minute period. The mixture was allowed to warm to room temperature over the next hour. The powder-dispensing funnel was replaced by a modified Dean-Stark receiver topped by a condenser and a nitrogen outlet and the reaction mixture was heated to 168° C. When the reaction mixture was at this temperature, 130 ml of N-cyclohexylpyrrolidone were added and the reaction flask was swept with a brisk stream of nitrogen. The volatiles (mostly water and NMP) were collected in the Dean-Stark receiver. After two hours, the nitrogen sweep was reduced to a moderate flow and heating was continued for an additional ten hours. Once cool, the viscous reaction mixture was diluted with 150 ml of NMP and the needle-like crystals of triethylamine hydrochloride were removed by Buchner filtration. The polyamide-imide was precipitated by addition of the filtrate to two liters of methanol in a blender. The yellow powder was isolated by Buchner filtration. The powder was re-suspended in methanol, blended, and filtered three more times, then dried at 100° C. under vacuum overnight. The yield of light yellow powder was 69 g. The polymer's IV was 1.17 dL/g (NMP); the midpoint glass transition temperature (determined by Differential Scanning Calorimetry) was 330° C. The $M_n$, $M_w$ and $M_z$ were determined by GPC to be 13030, 37250, and 61695 g/mol, respectively. The polymer's imide content was greater than 96%. A spinning dope was formed by dissolving the resin obtained above in N-methyl pyrrolidone, to solids concentration 13.5% (falling ball viscosity 1226 poise). The dope was extruded at room temperature, through a spinneret having 20 holes of 150 micron diameter, into an ethylene glycol coagulation bath. The coagulated filaments were taken-up by a set of twin rolls rotating at 1.6 m/min and were spray-washed by water, while travelling on the rolls. Subsequently, they were led through a boiling water bath and taken-up by a second set of rolls rotating at 1.7 m/min, where they dried, and were then drawn with a draw ratio 1.6 x through a tube furnace at a temperature 365° C. and were wound on a package at a collection speed of 2.7 m/min. The collected fiber, which was partially oriented, was subjected to a second drawing through a 360° C. tube furnace with a draw ratio 2.8 x (total draw ratio 4.7 x). The final product had 5.2 denier per filament, tenacity 4.4 gpd, modulus 82 g/den, and elongation 13%. The thermal/oxidative stability of the fiber was as follows:

| | |
|---|---|
| Tenacity retained after 2 months at 200° C.: | 65% |
| Elongation retained after 2 months at 200° C.: | 71% |
| Shrinkage at 200° C.: | Less than 1% |
| Tenacity retained after 2 days at 270° C.: | 66% |
| Elongation retained after 2 days at 270° C.: | 116% |
| Shrinkage at 270° C.: | 4.4% |

The retained tenacity and elongation were measured at room temperature. The fiber's tenacity measured at 260° C. (without prolonged aging) is 65% of the room temperature value.

COMPARATIVE EXAMPLE 2

A polyamide-imide was prepared as described on Example C from TMAC (65.62 g, 0.31 mol) and TDA (37.74 g, 0.31 mol). The IV of the polymer was 0.71 dl/g; its number, weight, and z-average molecular weights were 9120, 25120, and 42415 g/mol, respectively. Nonaqueous titration indicated that the polymer was fully imidized. A test tube equipped with a vacuum adapter was charged with a sample of the polymer and evacuated to <0.1 torr. The tube was placed in a sand bath and heated at 100° C. for an hour to remove residual traces of solvent. The sample was then heated at 300° C. for six more hours. The resulting polymer had an IV of 1.0 dl/g (NMP); its $M_n$, $M_w$ and $M_z$ were 13505, 46250, and 104,980 g/mol, respectively. An attempt was made to produce a spinning dope from this resin. The resin was combined with NMP to 15% solids concentration. However, instead of a homogenous spinning dope a rubbery gel was formed. The gel was incapable of fluid flow, it could not be transferred to the spinning assembly for spinning, and would not produce long liquid filaments such as obtained in the spinning carried out in Example 1. Gel formation in the dope indicated an unaceptable degree of cross-linking in the resin, rendering it unsuitable for spinning.

EXAMPLE 3

A 2-liter, 3-neck flask was fitted with two Y-joints, condenser, addition funnel, thermocouple, teflon stirring paddle, nitrogen inlet, and a bubbler. Methanol (1.15 grams, 0.036 mol) was added to 602.7 grams of NMP. TMA (137.9 grams, 0.72 mol) and 563 grams of the methanol-containing NMP were charged to the flask. The flask was heated to 90° C. TDI (126.2 grams, 0.72 mol) was added over 1-hr. period. $CO_2$ started coming through the bubbler. After TDI addition was completed, the funnel was rinsed with the remaining NMP into the reactor. The system was held at 90° C. for 5 hrs. and then heat and stirring were shut off and the system was allowed to stand overnight. The next day stirring and heat-up were restarted. The temperature was maintained at 130° C. for 2 hrs. and then increased to 180° C. and held for 6 hrs., until $CO_2$ evolution ceased. Subsequently, the flask was cooled in a water bath to 38° C. and then the reaction solution was precipitated with water in a blender. The precipitated powder was filtered, washed, and dried under vacuum at 80° C. for 16 hrs. The polymer had an IV of 0.33 dl/g (NMP). Its $M_n$, $M_w$ and $M_z$ were 5570, 11,990 and 21,240. The polymer had an imide content of greater than 96%. The foregoing IV and molecular weight averages were measured on undrawn fiber, spun as follows. A spinning dope was formed by dissolving the above resin in N-methyl pyrrolidone, to solids concentration 40% (falling ball viscosity 774 poise). The dope was extruded at room temperature, through a spinneret having 30 holes of 75 micron diameter, into an ethylene glycol coagulation bath. The coagulated filaments were taken up by a set of twin rolls rotating at 3.1 m/min. and were spray-washed by water while travelling on the rolls. Subsequently, the filaments were led through a boiling water bath and taken up by a second set of rolls rotating at 3.1 m/min. where they dried and collected by a winder on a paper tube. At a later date, the undrawn fiber package was subjected to hot drawing through a tube furnace at 375° C., with draw ratio 7 x. The drawn multifilament fiber had size of 4.1 denier per filament, tenacity 2.2 gpd, modulus 47 gpd, and elongation 27%. As-spun fiber was collected under the above conditions on a metal tube. This package was subjected to thermal treatment for 21 hours at 232° C. The treated fiber was then drawn through a tube furnace at 375° C. with draw ratio 6 x. The resulting multifilament fiber had size 5.3 denier per filament, tenacity 2.7 gpd, modulus 49 gpd, and elongation 26%.

EXAMPLE 4

To a 15-gallon stirred tank batch reactor, equipped with an overhead condenser was charged NMP (52.7 lbs), mixed with methanol catalyst (55.4 g). Subsequently, TMA (14.8 lbs, 33.5 mol) was added over a period of 30 min. The heat was turned on to 88° C. at the beginning of the addition. After the TMA had dissolved, molten TDI was added over a 1-hour period, and the reaction mixture was maintained at 88° C. for two additional hours. At that point, the temperature set point was set to 130° C. That temperature was reached after 1 hour. The reaction mixture was maintained at 130° C. for 3 additional hours. At the end of this three hour period, the temperature set point was adjusted to 182° C. That temperature was reached after 1 hour and 15 minutes. The reaction mixture was held at 182° C. for 5 additional hours. At the end of the 5 hours, heating stopped and the reactor was allowed to cool overnight. When the temperature reached 65° C., the viscous reaction solution containing 29.6 wt. % amide-imide resin in NMP solvent was measured in a Brookfield viscometer and was found to have viscosity greater than 2000 poise. Additional NMP was added and thoroughly mixed into the reactor to adjust the concentration to 27.6% solids, targeting to dope viscosity of about 1000 poise at room temperature. The final dope product had a viscosity of 1040 poise. A portion of the resin solution was precipitated and the resulting solid TMA-TDI resin was found to have IV of 0.57, $M_n$ of 8110, $M_w$ of 21150 and $M_z$ of 47550. The imide content of the resin was greater than 96%. The TMA-TDI resin dope was solution-spun in the manner described in the following four examples.

EXAMPLE 5

The TMA-TDI resin solution obtained in Example 4 was-spun to continuous multifilament as follows: The solution, which was kept in a 0.25 gallon-size pot at room temperature, was extruded through a spinneret having 50 holes, each 75 microns in diameter, into an ethylene glycol coagulation bath at 29° C. The as-spun multifilament was taken up and washed at 2.7 m/min by a set of two canted rolls, with water sprayed on them. The number of passes around these rolls was 15. Subsequently, the wet fiber was guided through a boiling water bath and then was picked up by a second set of twin rolls, rotating at 2.7 m/min. The fiber travelled 5 passes around these rolls in order to dry to a desired moisture level and then was fed into a tube furnace where it was drawn at a temperature of 380° C., with draw ratio 8 x. The drawn fiber was taken up by a third set of twin rolls rotating at 21.6 m/min, and finally collected by a winder on a paper tube.

The fiber properties were: total denier 88, tenacity 3.8 gpd, modulus 61 gpd, and elongation 20%. The fiber's tenacity measured at 260° C. (without prolonged aging) was 66% of the room temperature value. The fiber's thermal shrinkage was determined by exposing multifilament yarn specimens in a hot air oven for 1 min and measuring the specimen length before and after exposure. Thermal shrinkage values were as follows:

| | |
|---|---|
| 2.3% at 271° C. | 58% at 349° C. |
| 7.7% at 304° C. | 62% at 354° C. |
| 19% at 327° C. | 63% at 371° C. |
| 41% at 338° C. | 67% at 399° C. |
| 52% at 343° C. | 70% at 427° C. |

These results indicate that the fiber has very good dimensional stability up to 271° C. and shows a sharp increase of thermal shrinkage with temperature around the glass transition temperature (330°–349° C.). After around 360°–370° C. the shrinkage-temperature relationship levels off. The fiber shrinkage at 427° C. is representative of its maximum shrinkage level and is used in subsequent examples to correlate fiber shrinkage with flame behavior.

EXAMPLE 6

The TMA-TDI resin solution obtained in Example 4 was-spun to continuous multifilament as follows: The solution, which was kept in a 1.0 gallon pot at room temperature, was extruded through a spinneret with 100 holes, each 75 microns in diameter, into an ethylene glycol coagulation bath at 32° C. The as-spun multifilament was taken up and washed at 5.0 m/min. by a set of two canted rolls, with water sprayed on them. The number of passes around these rolls was 15. Subsequently, the wet fiber was guided through a boiling water bath and then was picked up by a second set of twin rolls, rotating at 5.0 m/min. and heated at 50° C. The fiber travelled 11 passes around these rolls in order to dry to a desired moisture level and then was fed into a tube furnace where it was drawn at a temperature of 400° C., with draw ratio 8 x. The drawn fiber was taken up by a third set of twin rolls rotating at 40.0 m/min., and finally collected by a winder on a paper tube.

The fiber properties were: total denier 200, tenacity 2.8 gpd, modulus 45 gpd, and elongation 31%. The thermal/oxidative stability of the fiber was as follows:

| Tenacity retained after 2 months at 200° C.: | 77% |
|---|---|
| Elongation retained after 2 months at 200° C.: | 84% |

The fiber's thermal shrinkage at 427° C. was 62%. A tubular sock knitted from this sample (on a Carolina 3.5" knitting machine) was subjected to a vertical flammability test according to NFPA 701. An area of fabric approximately 1" in length was destroyed in contact with the flame and the fabric self-extinguished after removing the flame, without any afterflame or burning debris. Inspection of the area destroyed by flame revealed that approximately half of the area charred and the other half shrunk away from the flame forming a gap.

EXAMPLE 7

The TMA-TDI resin solution obtained in Example 4 was-spun to continuous multifilament as follows: The solution which was kept in a 1.0 gallon pot at room temperature, was extruded through a spinneret with 100 holes, each 50 microns in diameter, into a water/NMP coagulation bath, containing 45% water and 55% NMP by volume, and being at a temperature of 17° C. The as-spun multifilament was taken up and washed at 5.0 m/min by a set of two canted rolls, with water sprayed on them. The number of passes around these rolls was 15. Subsequently, the wet fiber was guided through a boiling water bath and then was picked up by a second set of twin rolls, rotating at 5.0 m/min and heated at 47° C. The fiber travelled 9 passes around these rolls in order to dry to a desired moisture level and then was fed into a tube furnace where it was drawn at a temperature of 390° C., with draw ratio 7 x. The drawn fiber was taken-up by a third set of twin rolls rotating at 35.0 m/min, and finally collected by a winder on a paper tube.

The fiber properties were: total denier 180, tenacity 3.0 gpd, modulus 55 gpd, and elongation 25%. The fiber's thermal shrinkage at 427° C. was 65%. A tubular sock knitted from this sample (on a Carolina 3.5" knitting machine) was subjected to a vertical flammability test according to NFPA 701. An area of fabric approximately 1" in length was destroyed in contact with flame and the fabric self-extinguished after removing the flame without any afterflame or burning debris. Inspection of the area destroyed by flame revealed that approximately half of the area charred and the other half shrunk away from the flame forming a gap. The fibers prepared in this example and the preceding examples 6a and 6b are better for filter felt material in view of their higher strength, and for densified panel material in view of their higher thermal shrinkage. Thermal shrinkage permits more effective rigidification.

EXAMPLE 8

The TMA-TDI resin solution of Example 4 was-spun to continuous multifilament as follows: The solution which was kept in a 1.0-gallon pot at room temperature, was extruded through a spinneret with 100 holes, each 50 microns in diameter, into a water/NMP coagulation bath, containing 45% water and 55% NMP by volume, and being at a temperature of 17° C. The as-spun multifilament was taken up and washed at 5.0 m/min by a set of two canted rolls, with water sprayed on them. The number of passes around these rolls was 15. Subsequently, the wet fiber was guided through a boiling water bath and then was picked up by a second set of twin rolls, rotating at 5.0 m/min and heated at 47° C. The fiber travelled 9 passes around these rolls in order to dry to a desired moisture level and then was fed into a tube furnace where it was drawn at a temperature of 410° C., with draw ratio 7x. The drawn fiber was taken up by a third set of twin rolls rotating at 35.0 m/min., and finally collected by a winder on a paper tube.

The fiber properties were: total denier 180, tenacity 2.1 gpd, modulus 40 gpd, and elongation 35%. The fiber's thermal shrinkage at 427° C. was 51%. A tubular sock knitted from this sample (on a Carolina 3.5" knitting machine) was subjected to a vertical flammability test according to NFPA 701. An area of fabric approximately 1" in length was destroyed in contact with flame and the fabric self-extinguished after removing the flame without any afterflame or burning debris. Inspection of the area destroyed by flame revealed that all of the destroyed area had formed a char with good integrity without shrinkage. This performance of the fiber prepared in this example is better for protective clothing applications than the fiber prepared in examples 6b and 6c.

EXAMPLE 9

A 16-gallon, stirred tank batch reactor, equipped with an overhead condenser, was charged at room temperature with NMP (80 lbs), and TDA (9.00 lbs, 33.4 mol). Subsequently, TMAC (15.6 lbs, 33.6 mol) was added over a period of 1 hr. During TMAC addition, the reactor was maintained at a temperature below 40° C., by means of a cooling coil. After TMAC addition was complete, $CaCO_3$ slurry in NMP (3.72 lbs $CaCO_3$ and 12 lbs. of NMP) was added into the reactor, followed by addition of toluene. At that point, the reactor temperature was increased, with the help of a heating mantle, to 154° C., over a period of 45 min. The reactor was maintained at a temperature of 154° C.–185° C. for 6 hrs. During this time, toluene was added in two more equal installments, to a total of 14 lbs. The volatiles (41.2 lbs. total of NMP, water, and toluene) were removed by nitrogen sweep and condensed. At the end of the 6 hrs, heating stopped and the reactor was allowed to cool. When the temperature reached 135° C., the viscous reaction solution (19.9% polymer by weight) was discharged through a valve outlet. Part of the solution was precipitated in methanol in a blender. The yellow powder was isolated by Buchner filtration. The powder was resuspended in methanol, blended, and treated three more times with methanol, then dried at 100° C. under vacuum overnight and was tested for IV and molecular weight. The polymer's IV was 0.75 dl/g. The $M_n$, $M_w$ and $M_z$ were determined by GPC to be 9890, 27650, and 52850 g/mol, respectively. The polymer had an imide content of greater than 96%. Polymer solution taken out of the reactor and containing 19.9% polymer and 3% CaCl₂ by weight in N-methyl pyrrolidone. and having a falling ball viscosity of 1500 poise. was-spun to continuous multifilament as follows: The solution. which was kept in a 1-gallon pot at room temperature. was extruded through a spinneret with 100 holes, each 75 microns in diameter. into an ethylene glycol coagulation bath kept at 44° C. The as-spun multifilament was taken up and washed at 4.7 m/min by a set of two canted rolls, with water sprayed over them. The number of passes around these rolls was 15. Subsequently. the wet fiber was guided through a boiling water bath and then it was picked up by a second set of twin rolls, rotating at 5 m/min. which were heated to surface temperature 40° C. The fiber travelled 11 passes around these rolls in order to dry to a desired moisture level and then fed into a tube furnace where it was drawn at a temperature of 396° C., with draw ratio of 6X. The drawn fiber was taken up by a third set of twin rolls rotating at 30 m/min., passed through a finish oil applicator (to reduce static electricity) and finally collected by a winder on a paper tube. The multifilament fiber properties were: total denier 216. denier per filament 2.16, tenacity 3.9 gpd, modulus 62 gpd, and elongation 27%. The thermal/oxidative stability of the fiber was as follows:

| Tenacity retained after 2 months at 200° C.: | 103% |
| Elongation retained after 2 months at 200° C.: | 105% |

EXAMPLE 10

A 16-gallon. stirred tank batch reactor. equipped with an overhead condenser, was charged at room temperature with NMP (68 lbs), and TDA (10.0 lbs. 37.1 mol). Subsequently. TMAC (17.4 lbs, 37.4 mol) was added over a period of 1 hr. and 20 min. During TMAC addition. the reactor was maintained at a temperature below 35° C., by means of a cooling coil. After TMAC addition was complete. CaCO₃ slurry in NMP (4.00 lbs CaCO₃ and 14 lbs of NMP) was added into the reactor, followed by addition of 14 lbs. of toluene. At that point, the reactor temperature was increased, with the help of a heating mantle to 160° C. over a period of 40 min. The reactor was maintained at a temperature of 160° C.-180° C. for 4 hrs. During this time. another 14 lbs. of toluene were added. The volatiles (30 lbs. total of NMP, water, and toluene) were removed by nitrogen sweep and condensed. Another 5 lbs. of NMP were added during the heating period. At the end of the 4 hrs., heating stopped and the reactor was allowed to cool. When the temperature reached 154° C., another 3.6731 lbs. of NMP were added to adjust the polymer concentration to 20%. When the temperature reached 134° C., the viscous reaction solution was discharged through a valve outlet. Part of the solution was precipitated in methanol in a blender. The yellow powder was isolated by Buchner filtration. The powder was resuspended in methanol, blended, and treated three more times with methanol, then dried at 100° C. under vacuum overnight and was tested for IV and molecular weight. The polymer's IV was 0.64 dl/g. The $M_n$, $M_w$ and $M_z$ were determined by GPC to be 10020, 22500, and 40450 g/mol, respectively. The polymer had an imide content of greater than 96%. Polymer solution taken out of the reactor after the resin preparation of this Example and containing 20% polymer and 3% CaCl₂ by weight in N-methyl pyrrolidone, was-spun to a multifilament tow targeted for further processing to staple fiber: The solution. which was kept in a 1-gallon pot at room temperature. was extruded through a spinneret with 300 holes, each 75 microns in diameter. into an ethylene glycol coagulation bath kept at 40° C. The as-spun tow was taken up and washed at 2.7 m/min by a set of two canted rolls, with water spray over them. The number of passes around these rolls was 11. Subsequently, the wet fiber was guided through a boiling water bath and then it was picked up by a second set of twin rolls, rotating at 2.7 m/min., which were heated to surface temperature 54° C. The fiber travelled 11 passes around these rolls in order to dry to a desired moisture level and then was fed into a tube furnace where it was drawn at a temperature of 400° C., with draw ratio 6x. The drawn tow was taken up by a third set of twin rolls rotating at 16.2 m/min., passed through a finish oil applicator and finally collected by a winder on a paper tube. Single filaments extracted from the drawn tow had the following average properties: Denier per filament 2.3, tenacity 4.9 gpd, modulus 54 gpd, and elongation 22%.

We claim:

1. Resin comprising amide-imide repeating units of the following general formula:

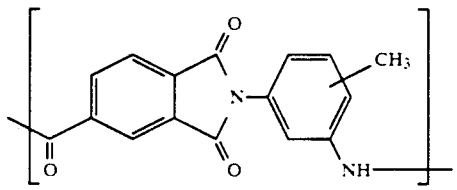

said resin having an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

2. The resin of claim 1 wherein said amide-imide polymer consists essentially of the reaction product of trimellitic anhydride and toluene diisocyanate, and wherein the resin has an inherent viscosity of from about 0.5 to about 0.9 dl/g; an $M_n$ in the range of from about 5000 to about 10,000 g/mole; a ratio of $M_w/M_n$ in the range of from about 2.1 to about 2.6; and a ratio of $M_z/M_w$ in the range of from about 1.7 to about 2.3.

3. The resin of claim 1 wherein said amide-imide polymer consists essentially of the reaction product of trimellitic anhydride chloride and toluene diamine, and wherein said resin has an inherent viscosity of from about 0.7 to about 1.0 dl/g; an $M_n$ of from about 9000 to about 14,000 g/mole; a ratio of $M_w/M_n$ in the range of from about 2.0 to about 3.0; and a ratio of $M_z/M_n$ of from about 1.6 to about 2.0.

4. Fiber having tenacity of at least about 1.5 grams per denier and elongation of at least about 10% solution-spun from the resin of claim 1.

5. Amide-imide resin comprising the polymeric condensation product of reactants selected from the group of reactant pairs consisting of (a) trimellitic anhydride and toluene diisocyanate and (b) trimellitic anhydride chloride and toluene diamine, said polymeric condensation product having an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

6. The amide-imide resin of claim 5 comprising the polymeric condensation product obtained from reactant pair (a), and wherein at least about 90% of polymer linkages derived from anhydride groups are imide linkages.

7. The amide-imide resin of claim 6 wherein said polymeric condensation product is essentially fully imidized and has an inherent viscosity in the range of from about 0.5 to about 0.9 dl/g; an $M_n$ in the range of from about 5000 to about 10,000 g/mole; a ratio of $M_w/M_n$ in the range of from about 2.1 to about 2.6; and a ratio of $M_z/M_w$ in the range of from about 1.7 to about 2.3.

8. The amide-imide resin of claim 5 comprising the polymeric condensation product obtained from reactant pair (b), and wherein at least about 90% of polymer linkages derived from anhydride groups are imide linkages.

9. The amide-imide resin of claim 8 wherein said polymeric condensation product is essentially fully imidized and has an inherent viscosity in the range of from about 0.7 to about 1.0 dl/g; an $M_n$ of from about 9000 to about 14,000 g/mole; a ratio of $M_w/M_n$ in the range of from about 2.0 to about 3.0; and a ratio of $M_z/M_n$ of from about 1.6 to about 2.0.

10. The amide-imide resin of claim 7 dissolved in a solution of polar solvent in an amount constituting from about 12 to about 45% by weight of the solution, wherein the resulting solution has a viscosity in the range of from about 300 to about 8000 poise.

11. The amide-imide resin of claim 10 wherein the toluene diisocyanate used to prepare the resin comprises a mixture of 2,6 and 2,4 isomers of toluene diisocyanate, and wherein the concentration of the amide-imide resin in the solution is in the range of about 25 to 35 wt. % and the viscosity of the solution is in the range of about 500 to about 1500 poise.

12. The amide-imide resin of claim 9 dissolved in a solution of polar solvent in an amount constituting from about 12 to about 45% by weight of the solution, said resin solution having a viscosity in the range of from about 300 to about 8000 poise.

13. The amide-imide resin of claim 12 wherein the toluene diamine used to prepare the resin comprises a mixture of 2,6 and 2,4 isomers of toluene diamine, and wherein the concentration of the amide-imide resin in the solution is in the range of about 15 to 25 wt. percent and the viscosity of the solution is in the range of about 500 to about 1500 poise.

14. Fiber having tenacity of at least about 1.5 grams per denier, and elongation of at least about 10%, solution-spun from amide-imide resin comprising the polymeric condensation product of reactants comprising at least one member selected from the group of reactant pairs consisting of (a) trimellitic anhydride and toluene diisocyanate and (b) trimellitic anhydride chloride and toluene diamine, said resin having an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

15. The fiber of claim 14 solution-spun from amide-imide resin comprising the polymeric condensation product obtained from reactant pair (a), and wherein at least about 90% of polymer linkages derived from anhydride groups are imide linkages.

16. The fiber of claim 15 wherein said polymeric condensation product is essentially fully imidized and has an inherent viscosity in the range of from about 0.5 to about 0.9 dl/g; an $M_n$ in the range of from about 5000 to about 10,000 g/mole; a ratio of $M_w/M_n$ in the range of from about 2.1 to about 2.6; and a ratio of $M_z/M_w$ in the range of from about 1.7 to about 2.3.

17. The fiber of claim 14 solution-spun from amide-imide resin comprising the polymeric condensation product obtained from reactant pair (b), and wherein at least about 90% of polymer linkages derived from anhydride groups are imide linkages.

18. The fiber of claim 17 wherein said polymeric condensation product is essentially fully imidized and has an inherent viscosity in the range of from about 0.7 to about 1.0 dl/g; an $M_n$ of from about 9000 to about 14,000 g/mole; a ratio of $M_w/M_n$ in the range of from about 2.0 to about 3.0; and a ratio of $M_z/M_n$ of from about 1.6 to about 2.0.

19. The fiber of claim 16 spun from a solution comprising said amide-imide resin dissolved in a polar solvent, wherein the amount of resin in the solution is in the range of from about 12 to about 45% by weight thereof, said resin solution having a viscosity in the range of from about 300 to about 8000 poise.

20. The fiber of claim 19 spun from said amide-imide resin solution wherein the concentration of the resin in the solution is in the range of about 25 to 35 wt. % and the viscosity of the solution is in the range of about 500 to about 1500 poise.

21. The fiber of claim 18 spun from a solution comprising said amide-imide resin dissolved in a polar solvent, wherein the amount of resin in the solution is in the range of from about 12 to about 45% by weight thereof, said resin solution having a viscosity in the range of from about 300 to about 8000 poise.

22. The fiber of claim 21 spun from said amide-imide resin solution wherein the concentration of the resin in the solution is in the range of about 15 to about 25% by weight of the solution, said resin solution having a viscosity in the range of from about 500 to about 1500 poise.

23. A process for manufacturing polyamide-imide resin which comprises the steps of:
(a) reacting, in a polar organic solvent in the presence of a suitable acid scavenger, trimellitic anhydride chloride and toluene diamine in a mole ratio of about 0.95:1 to about 1.01:1 to obtain a solution comprising a dissolved polymeric condensation product containing amide, imide and amic-acid linkages, wherein the reaction is carried out essentially to completion under conditions of time and temperature such that polymer linkages derived from anhydride moieties are predominantly amic-acid linkages;
(b) heating the solution obtained in (a) under conditions of time and temperature sufficient to obtain a solution wherein the condensation product present in said solution has undergone conversion to a polyamide-imide such that greater than about 90% of said polymer linkages derived from anhydride moieties are imide linkages; and
(c) continuing heating of the polyamide-imide solution obtained in step (b) until said polyamide-imide has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

24. The process of claim 23 wherein the heating of steps (b) and (c) is carried out at a temperature within the range of from about 130° C. to about 180° C. and wherein the condensation product obtained in step (a) is essentially fully imidized in step (b).

25. The process of claim 24 wherein said continued heating of step (c) is carried out until the polyamide-imide reaches a maximum inherent viscosity, and the polyamide-imide has an inherent viscosity in the range of from about 0.7 to about 1.0 dl/g; and $M_n$ of from about 9000 to about 14,000 g/mole; a ratio of $M_w/M_n$ in the range of from about 2.0 to about 3.0; and a ratio of $M_z/M_n$ of from about 1.6 to about 2.0.

26. The process of claim 25 wherein the amount of polar solvent employed in step (a) is such that the polyamide-imide solution obtained in step (c) comprises about 12 to about 45 wt. % polyamide-imide and has a viscosity in the range of from about 300 to about 8000 poise.

27. The process of claim 26 wherein the polyamide-imide solution obtained in step (c) comprises about 15 to about 25 wt. % polyamide-imide and has a viscosity in the range of from about 500 to about 1500 poise.

28. The process of claim 26 wherein the temperature of the solution obtained in step (a) is raised to the temperature of heating in step (b) after a period of time of about 20 to about 60 minutes.

29. The process of claim 27 wherein the solvent is N-methylpyrrolidone and the acid scavenger is selected from the group consisting of calcium carbonate, calcium oxide and triethylamine.

30. The process of claim 29 wherein the acid scavenger is calcium carbonate and step (a) is carried out at a temperature not exceeding about 30° C.

31. The process of claim 29 wherein the acid scavenger is calcium oxide and step (a) is carried out at a temperature not exceeding about −20° C.

32. A process for manufacturing polyamide-imide resin which comprises the step of reacting, in a solvent in the presence of a suitable catalyst, toluene diisocyanate and trimellitic anhydride in a mole ratio of from about 0.95:1 to about 1.01:1 at a temperature in the range of from about 150° C. to about 200° C. to obtain a solution comprising the dissolved amide-imide polymeric condensation product of said reactants in said polar solvent, wherein the reaction is conducted until at least about 90% of polymer linkages derived from anhydride groups are imide linkages, and the amide-imide condensation product has an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

33. The process of claim 32 comprising the following sequence of steps:
(a) charging the toluene diisocyanate over a period of from about 1 to about 3 hours to a reaction vessel comprising the trimellitic anhydride and the solvent, said reaction vessel being maintained within the temperature range of from about 75° C. to about 95° C. during said charge and for a period of about 1-6 hours thereafter;
(b) increasing the temperature of the reaction vessel to within the range of from about 120° to about 150° C. and maintaining the vessel at this temperature for a period of about 2-6 hours; and
(c) increasing the temperature of the reaction vessel to within the range of from about 160° to about 200° C. and maintaining the vessel at this temperature for a period of about 4-8 hours.

34. The process of claim 33 wherein the solvent is N-methylpyrrolidone, the catalyst is methanol present in an amount within the range of from about 1 to about 10 mole % based on moles of trimellitic anhydride, and wherein the toluene diisocyanate comprises a mixture of 2,6 and 2,4 isomers of toluene diisocyanate.

35. The process of claim 33 wherein the solvent is present in an amount such that the polyamide-imide solution obtained upon completion of the process comprises from about 15 to about 40 wt. % polyamide-imide and said solution has a viscosity within the range of from about 300 to about 8000 poise.

36. The process of claim 34 wherein the amount of catalyst is about 3 to about 7 mole percent; said solvent is present in an amount such that the polyamide-imide solution obtained upon completion of the process comprises from about 25 to about 35 wt. % polyamide-imide; and said solution has a viscosity in the range of from about 500 to about 1500 poise.

37. An improved process for solution-spinning heat-resistant polyamide-imide fiber having tenacity of at least about 1.5 and elongation of at least about 10%, said process generally comprising injection, through a spinneret into a liquid or gaseous fiber-forming medium, of a polymer solution comprising polyamide-imide resin dissolved in a polar solvent, where the polymer solution and fiber-forming medium are such that the polyamide-imide resin is essentially insoluble in the fiber-forming medium, such that upon injection of the polymer solution through the spinneret, said solvent diffuses from the polymer solution to the fiber-forming medium resulting in fiber formation; wherein the improvement comprises: injecting through said spinneret a polyamide-imide solution in which the polyamide-imide resin comprises the polymeric condensation product of reactants selected from the group of reactant pairs consisting of (a) trimellitic anhydride and toluene diisocyanate and (b) trimellitic anhydride chloride and toluene diamine, wherein greater than about 90% of polymer linkages derived from anhydride groups are imide linkages, and said polymeric condensation product has an inherent viscosity of from about 0.3 to about 1.3 dl/g; an $M_n$ of at least about 5000 g/mole; a ratio of $M_wM_n$ in the range of from about 1.7 to about 3.3; and a ratio of $M_z/M_w$ of not greater than about 2.3.

38. A process for producing heat-resistant polyamide-imide fiber having tenacity of at least about 1.5 grams per denier and elongation of at least about 10 percent, comprising the following steps in continuous sequence:
(a) injecting through a spinneret, into a liquid or gaseous fiber-forming medium, a polymer solution comprising polyamide-imide resin dissolved in a polar solvent, said polymer solution and fiber-forming medium being such that the polyamide imide-resin is essentially insoluble in the fiber-forming medium, and that upon injection of the polymer solution through the spinneret, said solvent diffuses from the polymer solution to the forming medium resulting in formation of polyamide-imide fiber;
(b) removing excess solvent from the fiber; and
(c) drawing the fiber at a temperature above the glass transition temperature of the polamide-imide resin;
wherein the polyamide-imide resin comprises the polymeric condensation product of reactants selected from the group of reactant pairs consisting of (a) trimellitic anhydride and toluene diisocyanate and (b) trimellitic anhydride chloride and toluene diamine. wherein greater than about 90% of polymer linkages derived from anhydride groups are imide linkages. said polymeric condensation product having an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

39. The process of claim 38 wherein the viscosity of the polymer solution is in the range of from about 300 to about 8000 poise; the polyamide-imide resin constitutes from about 12 to about 45 wt. % by weight of the solution; the fiber-forming medium is a liquid which is a solvent for the organic solvent of the polymer solution, but a non-solvent for the polyamide-imide resin; and wherein the fiber is drawn at a temperature of from about 330° C. to about 500° C. at a draw ratio of from about 2:1 to about 10:1.

40. The process of claim 39 wherein the drawing temperature is in the range of from about 375° C. to 400° C.

41. The process of claim 39 wherein the drawing temperature is in the range of from about 410° C. to 450° C.

42. The process of claim 39 wherein the polyamide-imide resin comprises the polymeric condensation product obtained from reactant pair (a).

43. The process of claim 42 wherein the polyamide-imide resin is essentially fully imidized and has an inherent viscosity in the range of about 0.5 to about 0.9 dl/g; an $M_n$ in the range of from about 5000 to about 10,000 g/mole; a ratio of $M_w/M_n$ in the range of from about 2.1 to about 2.6; and a ratio of $M_z/M_w$ in the range of from about 1.7 to about 2.3.

44. The process of claim 38 wherein the polyamide-imide resin comprises the polymeric condensation product obtained from reactant pair (b).

45. The process of claim 44 wherein the polyamide-imide resin is essentially fully imidized and has an inherent viscosity of from about 0.7 to about 1.0 dl/g; an $M_n$ of from about 9000 to about 14,000 g/mole; a ratio of $M_w/M_n$ in the range of from about 2.0 to about 3.0; and a ratio of $M_z/M_n$ of from about 1.6 to about 2.0.

46. A heat-resistant article comprising polyamide-imide fiber solution-spun from amide-imide resin comprising the polymeric condensation product of reactants comprising at least one member selected from the group of reactant pairs consisting of (a) trimellitic anhydride and toluene diisocyanate and (b) trimellitic anhydride chloride and toluene diamine, said resin having an inherent viscosity of from about 0.3 to about 1.3 dl/g; an $M_n$ of at least about 5000 g/mole; a ratio of $M_w/M_n$ in the range of from about 1.7 to about 3.3; and a ratio of $M_z/M_w$ of not greater than about 2.3.

47. A heat resistant article according to claim 46 wherein at least about 90% of polymer linkages of said amide-imide resin derived from anhydride groups are imide linkages.

* * * * *